United States Patent
Brenn et al.

(10) Patent No.: US 12,065,112 B2
(45) Date of Patent: Aug. 20, 2024

(54) METHOD FOR OPERATING A BRAKING SYSTEM, AND BRAKING SYSTEM

(71) Applicant: Continental Teves AG & Co. OHG, Frankfurt am Main (DE)

(72) Inventors: Martin Brenn, Mainz (DE); Thorsten Ullrich, Gernsheim (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 378 days.

(21) Appl. No.: 17/310,086

(22) PCT Filed: Dec. 18, 2019

(86) PCT No.: PCT/EP2019/085915
§ 371 (c)(1),
(2) Date: Jul. 15, 2021

(87) PCT Pub. No.: WO2020/151884
PCT Pub. Date: Jul. 30, 2020

(65) Prior Publication Data
US 2022/0073048 A1    Mar. 10, 2022

(30) Foreign Application Priority Data
Jan. 23, 2019    (DE) .................... 10 2019 200 807.0

(51) Int. Cl.
*B60T 17/22*    (2006.01)
*B60T 13/14*    (2006.01)
(Continued)

(52) U.S. Cl.
CPC ............ *B60T 17/06* (2013.01); *B60T 13/142* (2013.01); *B60T 13/58* (2013.01); *B60T 13/662* (2013.01);
(Continued)

(58) Field of Classification Search
CPC ...... B60T 13/58; B60T 13/142; B60T 13/662; B60T 17/06; B60T 17/225; B60T 2270/402
(Continued)

(56) References Cited

U.S. PATENT DOCUMENTS 8,246,122 B2 * 8/2012 Yamamoto ............ B60T 8/4081
                                                    303/122.1
8,813,560 B2 * 8/2014 Neumann ............... B60T 11/26
                                                    73/290 R
(Continued)

FOREIGN PATENT DOCUMENTS

CN    2009040359 A    2/2009
CN      101772442 A    7/2010
(Continued)

OTHER PUBLICATIONS

German Search Report dated Jan. 14, 2020, for the corresponding German Patent Application No. 10 2019 200 807.0.
(Continued)

*Primary Examiner* — Christopher P Schwartz

(57) ABSTRACT

A braking system having wheel brakes, a pressure supply device connected to the wheel brakes, a master brake cylinder actuated by a brake pedal and connected to the wheel brakes, and a brake fluid reservoir having a first and a second reservoir chamber separated by a partition wall, wherein the first reservoir chamber is connected to the pressure supply device, via which the pressure supply device is supplied with pressure medium, and the second reservoir chamber is connected to the master brake cylinder, via which the master brake cylinder is supplied with pressure medium The braking system is operated in a first operating mode when the first filling level is reached and a second operating
(Continued)

mode when the second filling level is reached, and a hydraulic fallback level if a lowest filling level is reached.

2 Claims, 6 Drawing Sheets

(51) Int. Cl.
*B60T 13/58* (2006.01)
*B60T 13/66* (2006.01)
*B60T 17/06* (2006.01)

(52) U.S. Cl.
CPC ....... *B60T 17/225* (2013.01); *B60T 2270/402* (2013.01)

(58) Field of Classification Search
USPC ... 303/114.1, 122.03, 122.09, 122.1, 122.13, 303/122.14
See application file for complete search history.

(56) References Cited

U.S. PATENT DOCUMENTS

| | | | |
|---|---|---|---|
| 10,046,744 B2 * | 8/2018 | Oosawa | B60T 8/94 |
| 11,767,003 B2 * | 9/2023 | Nakayasu | B60T 13/686 303/6.01 |
| 2010/0229547 A1 | 9/2010 | Takahashi | |
| 2012/0038209 A1 | 2/2012 | Yamamoto | |
| 2017/0015290 A1 | 6/2017 | Oosawa et al. | |
| 2021/0339726 A1 * | 11/2021 | Kim | B60T 7/042 |
| 2022/0055582 A1 * | 2/2022 | Takimoto | B60T 13/686 |

FOREIGN PATENT DOCUMENTS

| | | |
|---|---|---|
| CN | 2015182631 A | 10/2015 |
| CN | 106132790 A | 11/2016 |
| DE | 3824918 A1 | 1/1990 |
| DE | 10147181 A1 | 12/2002 |
| DE | 112008002155 B4 | 11/2012 |
| DE | 102017222789 A1 | 6/2019 |
| JP | 2008290509 A | 12/2008 |
| JP | 2009132354 A | 6/2009 |
| JP | 2010208547 A | 9/2010 |
| WO | 2005014352 A1 | 2/2005 |
| WO | 2011002594 A1 | 1/2011 |
| WO | 2019105748 A1 | 6/2019 |

OTHER PUBLICATIONS

International Search Report and the Written Opinion of the International Searching Authority mailed on May 11, 2020, for the counterpart PCT Application No. PCT/EP2019/085915.
Chinese Office Action dated Mar. 4, 2023 for the counterpart Chinese Patent Application No. 201980088990.X.
Korean Office Action dated Apr. 10, 2023 for the counterpart Korean Patent Application No. 10-2021-7020547.
Notice of allowance dated Jan. 22, 2024, of counterpart KR application No. 10-2021-7020547.
Korean Office Action dated Oct. 28, 2023 for the counterpart Korean Application No. 10 2021 7020547 and translation of same.
Chinese Second Action dated Oct. 31, 2023 for the counterpart Chinese Application No. 201980088990 and translation of same.

* cited by examiner 100,065,112 B2

METHOD FOR OPERATING A BRAKING SYSTEM, AND BRAKING SYSTEM

CROSS-REFERENCE TO RELATED APPLICATIONS

The present application is a National Stage Application under 35 U.S.C. 371 of International Application No. PCT/EP2019/085915 filed on Dec. 18, 2019, which claims priority from German Patent Application No. 102019200807.0 filed in the German Patent and Trade Mark Office on Jan. 23, 2019, the disclosures of which are herein incorporated by reference in their entireties.

BACKGROUND

1. Field

The invention relates to a method for operating a braking system having hydraulically actuatable wheel brakes, which system has an electrically controllable pressure supply device, which is separably connected to the wheel brakes, a master brake cylinder, which can be actuated by means of a brake pedal and which is separably connected to the wheel brakes, and a brake fluid reservoir having a first and at least one second reservoir chamber, which are separated by a first partition wall, wherein the first reservoir chamber is connected to the pressure supply device via a first port for fluid removal, via which the pressure supply device is supplied with pressure medium, and the at least one second reservoir chamber is connected to the master brake cylinder via at least one second port for fluid removal, via which the master brake cylinder is supplied with pressure medium, wherein, by means of at least one brake fluid sensor, a first and a second filling level in the brake fluid reservoir are determined, wherein the second filling level is lower than the first filling level, wherein the braking system is operated in a first operating mode when the first filling level is reached and is operated in a second operating mode when the second filling level is reached. The invention furthermore relates to a braking system.

2. Description of Related Art

WO 2005/014352 A1 discloses a braking system which comprises a brake pressure transmitter which can be actuated by means of a brake pedal, a pressure medium supply reservoir and at least one electrohydraulic pressure source. The pressure medium supply reservoir comprises a first and a second chamber, wherein the pressure source is connected to the first chamber, and the brake pressure transmitter is connected to the second chamber. The separation of the brake pressure transmitter and the pressure source is intended to impart a comfortable pedal feel during a "brake-by-wire" operating mode. Means for determining the pressure medium level in the first and second chamber are provided.

DE 101 47 181 A1 describes a filling level measuring device for a pressure medium supply reservoir.

In known braking systems, brake fluid switches are used to inform the driver about the loss of brake fluid.

In a brake-by-wire braking system, leaks may in principle occur in the following regions:

actuator part: refill chamber, linear actuator and intermediate connections

TMC part—primary circuit: primary chamber of the reservoir, leaks in the tandem master brake cylinder (TMC) itself TMC part—secondary circuit: secondary chamber of the reservoir, simulator one of the front wheels
one of the rear wheels In known brake-by-wire systems, the brake fluid switch is used to detect whether there is sufficient brake fluid available to the internal actuator. If there is insufficient fluid and continued intake by the brake-by-wire system, the braking system is contaminated with air, this being equivalent in principle to the failure of the braking system. For this purpose, the switch is used to revert back from the by-wire mode to the hydraulic fallback level.

By installing a second stage above the partition wall, the driver can be warned at an early stage about brake fluid losses.

The known prior art has the disadvantage that, in the event of leakage in the wheel, the braking system will lapse into a single-circuit, unintensified, hydraulic fallback level. Owing to the electrification of vehicles and the ever greater vehicle mass as a result, system design calculations show that, in the event of a failure in a single circuit, the driver can either not produce the required deceleration or cannot get the required volume from the tandem master brake cylinder. The result is that the braking system in its current form is not suitable for these vehicles.

In general, the requirement for a reserve volume within the TMCs for a given deceleration of 2.44 $m/s^2$ is not met in the case of a single-circuit failure owing to the large volumetric capacity.

Examples of acceptable lower-level performance are:

two-circuit hydraulic fallback level without system intensification single-circuit operation with system intensification (in this case, two wheels are isolated by means of the inlet valves, while the volume and pressure are produced by the system actuator).

operation of one diagonal component
only front wheels (black/white split)
only rear wheels One example of unacceptable lower-level performance is a single-circuit hydraulic fallback level without system intensification.

SUMMARY

The invention is therefore based on the object of providing a method for improved lower-level performance. The aim is also to provide a corresponding braking system.

In respect of the method, this object is achieved, according to the invention, by virtue of the fact that at least one additional filling level, which is lower than the first and second filling levels, is monitored by means of the brake fluid sensor, and wherein the braking system is switched to a hydraulic fallback level only if the lowest monitored filling level is reached.

The dependent claims relate to advantageous embodiments of the invention.

The invention starts from the consideration that operation of a brake-by-wire braking system at the hydraulic fallback level should be avoided as far as possible. It would therefore be advantageous to be able to reliably determine whether, when leakage is detected at least in two wheel brakes of the braking system, it is still possible to actively build up wheel brake pressure by means of the pressure supply device in a reliable manner.

As has now been recognized, it is possible by using a three-stage brake fluid sensor and a modified concept of lower performance to prevent the lower performance level of the single-circuit hydraulic fallback level without system intensification. For this purpose, a third switching threshold is inserted below the partition wall within the reservoir.

In this context, a hydraulic fallback level is taken to mean an operating mode of the braking system in which pressure is not built up in the wheel brakes by means of the pressure supply device.

It is advantageous if the at least one additional filling level is a third filling level, wherein the first filling level is above a partition wall in the brake fluid reservoir, and wherein the second and third filling levels are below a partition wall in the brake fluid reservoir.

In a preferred embodiment, a third and a zero filling level are determined as additional filling levels, wherein the third filling level is lower than the first and second filling levels, and wherein the zero filling level is higher than the first filling level.

It is advantageous if the second filling level is above a partition wall in the brake fluid reservoir.

A warning is preferably emitted when the zero filling level is reached. This warning can involve the illumination of a warning lamp, in particular a red warning lamp. In addition or as an alternative, it can also be acoustic.

The slope of the brake fluid reservoir is preferably determined by means of a sensor, wherein the warning is suppressed if the slope determined is greater than a predetermined slope threshold. In this way, it is possible to avoid false alarms resulting from a drop in the level resulting from the position of the vehicle on a slope.

It is advantageous if wheel brake pressure is actively built up in the wheel brakes on one axle by means of the pressure supply device in the first operating mode, wherein wheel brake pressure is actively built up in the wheel brakes on the other axle by means of the pressure supply device in the second operating mode.

It is advantageous if the master brake cylinder is separated hydraulically from the wheel brakes in the first and second operating modes.

Preferably, wheel brake pressure is actively built up in the front wheel brakes in the first operating mode, and wheel brake pressure is actively built up in the rear wheel brakes in the second operating mode.

At the hydraulic fallback level, it is advantageous if the pressure supply device is separated from the wheel brakes and the master brake cylinder is connected to the wheel brakes, with the result that brake pressure in the wheel brakes is provided by the master brake cylinder.

The respective filling level in the chamber of the brake fluid reservoir which is associated hydraulically with the pressure supply device is preferably measured.

The highest filling level determined is preferably above the partition wall.

With regard to the braking system, the above-stated object is achieved according to the invention by means of an open-loop and closed-loop control unit for carrying out a method described above.

The brake fluid reservoir of the braking system preferably comprises three chambers, of which the first chamber is associated hydraulically with the pressure supply device, and wherein the other two chambers are each associated hydraulically with the second brake circuit and the first brake circuit, and wherein adjacent chambers are separated from one another by partition walls, and wherein the partition walls are of the same height.

The advantages of the invention lie, in particular, in the fact that, instead of a relatively expensive staged TMC which can maintain the volume balance with a small TMC diameter, this electronic system in combination with a three-stage sensor can support more advantageous TMC solutions.

BRIEF DESCRIPTION OF THE DRAWINGS

One exemplary embodiment of the invention will be described in greater detail with reference to a drawing, in which, in a highly schematic view.

DETAILED DESCRIPTION

In all of the figures, identical parts are denoted by the same reference designations.

Figure 1:
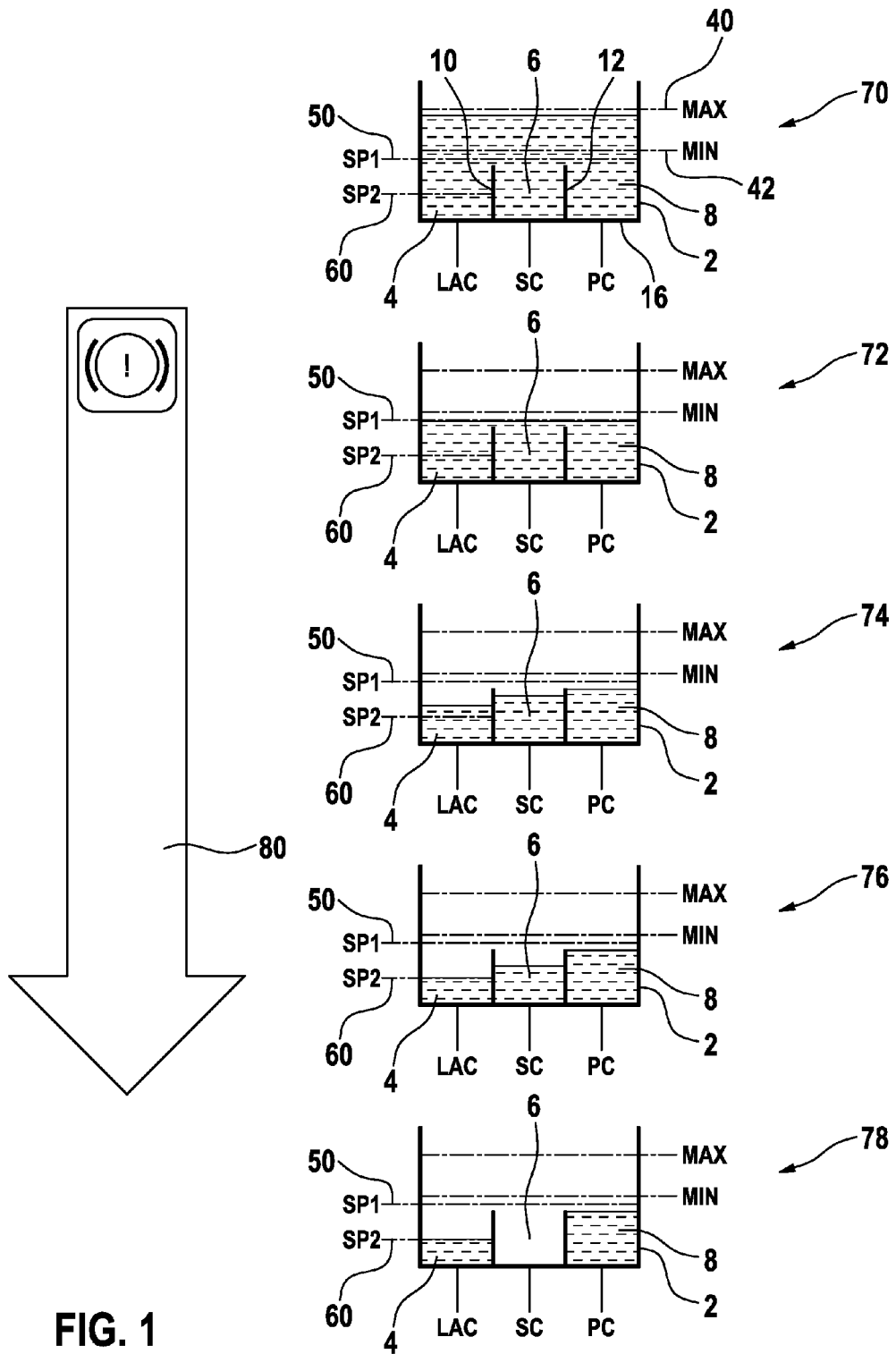
FIG. 1 shows a flow diagram of events in the case of leakage in the prior art.

FIG. 1 illustrates a flow diagram for a braking medium reservoir 2 having a first chamber 4, a second chamber 6 and a third chamber 8. The first chamber 4 is associated with a pressure supply device 20 of a braking system 30 (see FIG. 2). The second chamber 6 is associated with the secondary circuit II, and the third chamber 8 is associated with the primary circuit I.

The two chambers 4 and 6 are separated from one another by a partition wall 10. Chambers 6 and 8 are separated from one another by a partition wall 12. Partition walls 10 and 12 are of the same height, i.e. they are of the same height above the reservoir bottom 16.

A two-stage brake fluid sensor 34 (see FIG. 2) measures the level in the brake fluid reservoir 2, in which a maximum level 40 and a minimum level 42 are defined, both levels being higher than the height of the partition walls 10, 12. A first 50 and a second 60 level warning stage, at which the brake fluid sensor 34 emits a warning, are furthermore defined. Both stages 50, 60 are below the minimum level 42. An arrow 80 points in the direction of events which occur in the case of leakage.

A first illustration 70 of the reservoir 2 indicates an initial state (no leakage). The filling level is between the minimum level 42 and the maximum level 40. The braking system 30 is power-operated in a normal operating mode.

In illustration 72, the brake fluid level is below the first warning stage 50. If this state persists for longer than a predetermined period of time, preferably 10 seconds, a warning is issued to the driver. The braking system remains in the by-wire mode, i.e. pressure continues to be built up actively in all the wheel brakes by means of a pressure supply device. In this state too, the braking system 30 is power-operated in a normal operating mode.

In illustration 74, the level in the chambers 4 (pressure supply device) and 6 (secondary circuit) has fallen further.

In a normal operating mode, the braking system 30 is preferably power-operated, and the driver is warned by a warning lamp.

In illustration 76 the brake fluid level in chamber 4 has fallen below the second level warning stage 60. The system falls back to HFL (+FSI) (hydraulic fallback with integrated parking brake), i.e. braking assistance with EPB (electronic parking brake).

In this operating mode, all four wheel brakes are operated, this depending on the magnitude of the leakage.

In illustration 78, the chamber 6 of the secondary circuit is in the meantime empty, and it is therefore no longer possible to build up any braking torque by means of the wheel brakes of the secondary circuit. The HFL mode is still effective in the primary circuit (+FSI), i.e. with two wheel brakes.

Figure 2:
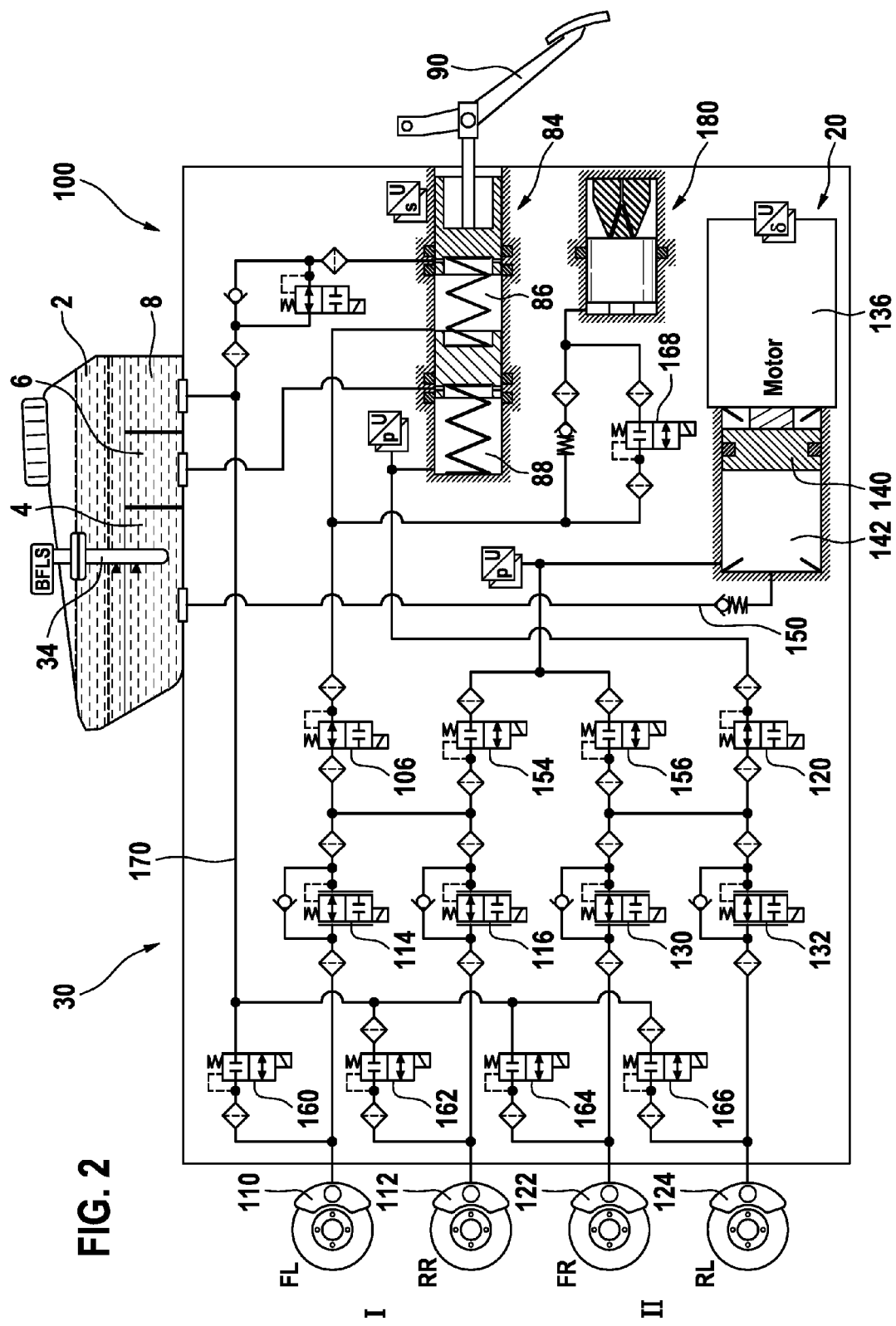
FIG. 2 shows a prior art braking system.

FIG. 2 illustrates a known braking system 100. The braking system 100 comprises a master brake cylinder 84 having two pressure spaces 86, 88. The master brake cylinder 84 is actuated by the driver of the motor vehicle via a brake pedal 90. The master brake cylinder 84 is connected to a pressure medium supply reservoir or brake fluid reservoir 2 and is supplied with pressure medium therefrom. Here, each of the pressure spaces 86, 88 has a dedicated port connected to the pressure medium supply reservoir 2.

The first pressure space 86 of the master brake cylinder 84 is connected via a first isolation valve 106 to a first brake circuit I, to which the first and the second wheel brake 110, 112 are connected. According to the example, the first isolation valve 106 is configured to be normally open. Here, the first and second wheel brake 110, 112 are expediently connected via a respective inlet valve 114, 116.

The second pressure space 88 of the master brake cylinder 84 is connected via a second isolation valve 120 to a second brake circuit II, to which the third and the fourth wheel brake 120, 124 are connected. According to the example, the second isolation valve 120 is configured to be normally open. Here, the third and fourth wheel brake 122, 124 are expediently connected via a respective inlet valve 130, 132.

The braking system 100 also comprises a pressure supply device 20. According to the example, the pressure supply device 20 comprises a motor 136, by means of which a piston 140 can be displaced in a hydraulic pressure space 142 of a pressure supply device (PSD pressure space), whereby a pressure can be built up. The pressure supply device 20 is connected via a connection 150 to the pressure medium supply reservoir 2 and is supplied with pressure medium therefrom.

According to the example, the pressure supply device 20 is separably connected via a first sequence valve 154 to the first and second wheel brake 110, 112 and separably connected via a second sequence valve 156 to the third and the fourth wheel brake 122, 124.

According to the example, the braking system 100 can be operated in a normal mode, which corresponds to a so-called "by-wire" mode. In the normal mode, the first and the second isolation valve 106, 120 are closed, with the result that the master brake cylinder 84 is decoupled from the wheel brakes 110, 112, 122, 124. The sequence valves 154, 156 are opened, and pressure in the wheel brakes is generated by the pressure supply device 20.

In the normal mode, a pressure buildup by the pressure supply device 20 can be carried out even independently of an actuation of the brake pedal 90. Wheel brake pressure can be reduced at the wheel brakes 110, 112, 122, 124 by opening outlet valves 160, 162, 164, 166, via which the wheel brakes 110, 112, 122, 124 are connected to a common return line 170 and, via the latter, to the pressure medium supply reservoir 2. Alternatively, it is possible to provide separate return lines (not shown), with advantageously the first and second wheel brake 110, 112 being connected to a first return line and the third and fourth wheel brake 122, 124 being connected to a second return line. The return lines are connected to different chambers of the brake fluid reservoir 2.

The inlet valves 114, 116, 130, 132 are individually switchable to set different pressures in the wheel brakes. Braking control functions known per se (for example EBD, ABS, ASR, ESC, ACC, etc.) can be carried out by means of the braking system 100.

The braking system 100 can be operated in a first fallback operating mode. For this purpose, according to the example, the pressure supply device 20 is separated from the wheel brakes 110, 112, 122, 124 by virtue of the sequence valves 154, 156 being closed. The master brake cylinder 84 is hydraulically connected to the wheel brakes 110, 112, 122, 124 by virtue of the isolation valves 106, 120 being opened such that brake pressure is provided in the wheel brakes 110, 112, 122, 124 by the master brake cylinder 84. Here, the pressure supply device 20 is not used for pressure buildup.

Furthermore, the braking system 100 can also be operated in a second fallback operating mode in which, according to the example, the master brake cylinder 84 is separated from the wheel brakes 110, 112, 122, 124 by closing the isolation valves 106 or 120, and the pressure supply device 20 is connected to at least some of the wheel brakes by virtue of the first sequence valve 154 and/or the second sequence valve 156 being opened. Brake pressure for actuating some of the wheel brakes is provided by the pressure supply device 20.

Here, brake pressure in the first and second wheel brake 110, 112 is provided by the pressure supply device 20 by virtue of the first sequence valve 154 being opened, or brake pressure in the third and fourth wheel brake 122, 124 is provided by the pressure supply device 20 by virtue of the second sequence valve 156 being opened, or pressure in all four wheel brakes is provided by virtue of both the first and the second sequence valve 154, 156 being opened. At the same time, the respective equivalent isolation valve is closed.

Depending on the design of the sequence valves, it can be advantageous to close, with a sequence valve, the respectively associated inlet valves at the same time. This is advantageous particularly when a pressure in the pressure supply device 20 exerts an opening action on the sequence valves.

According to the example, the first and second wheel brake 110, 112 are arranged on different vehicle sides, advantageously on a diagonal. Accordingly, the third and fourth wheel brake 122, 124 are also arranged on different sides of the vehicle. For example, the third wheel brake 122 is the front right wheel brake (FR), the fourth wheel brake 124 is the rear left wheel brake (RL), the first wheel brake 110 is the front left wheel brake (FL), and the second wheel brake 112 is the rear right wheel brake (RR). Other arrangements are also possible.

According to the example, in the first and in the second fallback operating mode, the outlet valves 160, 162, 164, 166 of the wheel brakes 110, 112, 122, 124 are kept closed, with the result that displacement of pressure medium between the chambers of the pressure medium supply reservoir 2, and thus between the brake circuits I, II, is prevented. According to the example, control functions which bring about opening of the outlet valves 160, 162,

164, 166 are switched off. If separate return lines are provided, it is possible for control functions which require opening of the outlet valves to remain partially switched on if no displacement of pressure medium between the chambers of the pressure medium supply reservoir 2 is caused thereby.

However, because it is not to be expected of the driver to release and subsequently depress the brake pedal, it is preferred, in the first fallback operating mode, for only those control functions to remain switched on by which only a small part of the pressure medium in the master brake cylinder 84 is used, that is to say substantially the electronic brake force distribution EBD.

The braking system 100 has in a known manner a simulator 180, which gives the driver a familiar pedal feel in the normal mode (brake-by-wire).

As illustrated in FIG. 1, the brake fluid reservoir 2 comprises the first chamber 4, which is associated hydraulically with the pressure supply device 20, the second chamber 6, which is associated hydraulically with the second chamber 88 (secondary chamber) of the master brake cylinder 84, and the third chamber 8, which is associated hydraulically with the first chamber 86 (primary chamber) of the master brake cylinder 84. The braking system 100 furthermore comprises the two-stage brake fluid sensor 34.

Figure 3:
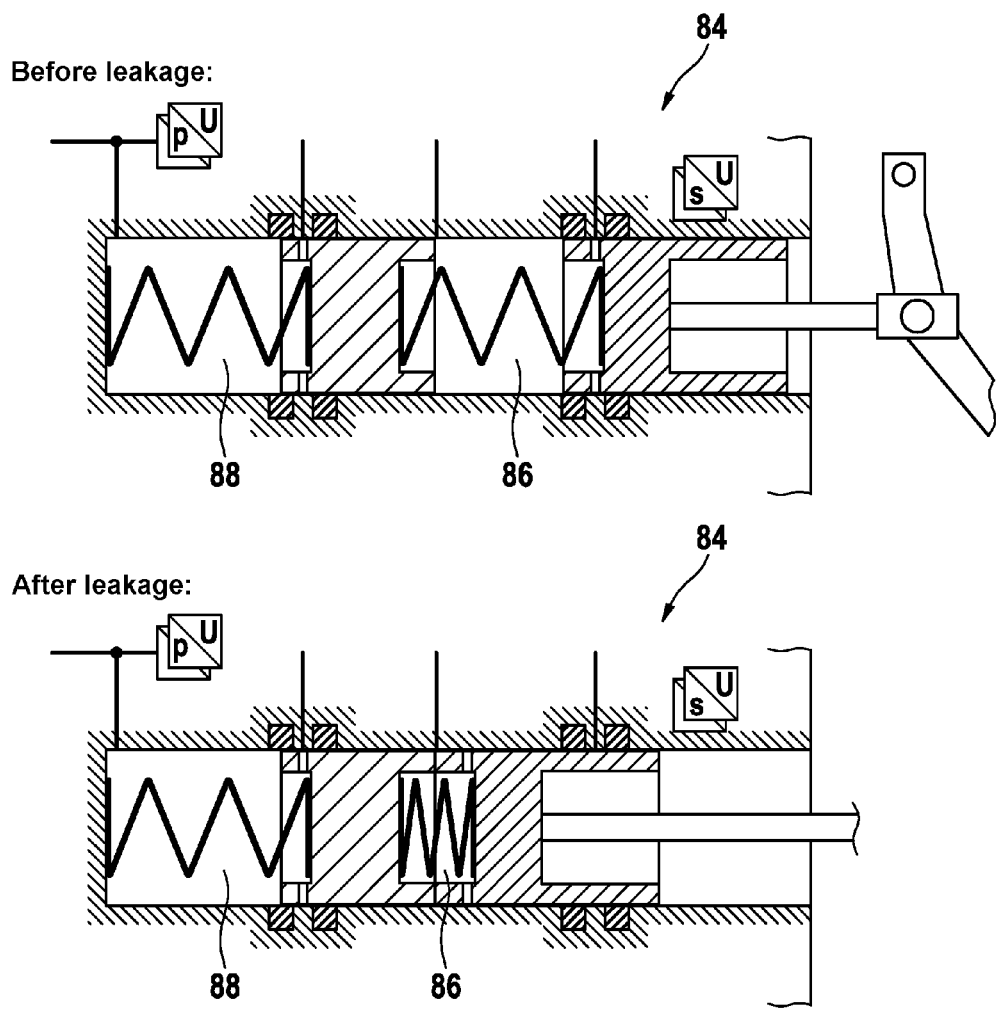
FIG. 3 shows a tandem master brake cylinder in two hydraulic states with and without leakage.

According to the example, the master brake cylinder 84 designed as a tandem master brake cylinder (TMC) is illustrated in a state before leakage in the upper illustration in FIG. 3. Both chambers 86, 88 are filled with brake fluid, thus making it possible, at a fallback level, in which the chambers 86, 88 of the master brake cylinder 84 are connected to the brake circuits I, II, for the driver to build up brake pressure in the wheel brakes of both brake circuits I, II by actuating the brake pedal 90.

In the lower illustration, owing to leakage, the primary chamber 86 does not contain any brake fluid or contains only an insufficient quantity to build up brake pressure in the wheel brakes of the primary circuit I when the brake pedal 90 is actuated. The secondary chamber 88 is still full of braking medium.

Figure 4:
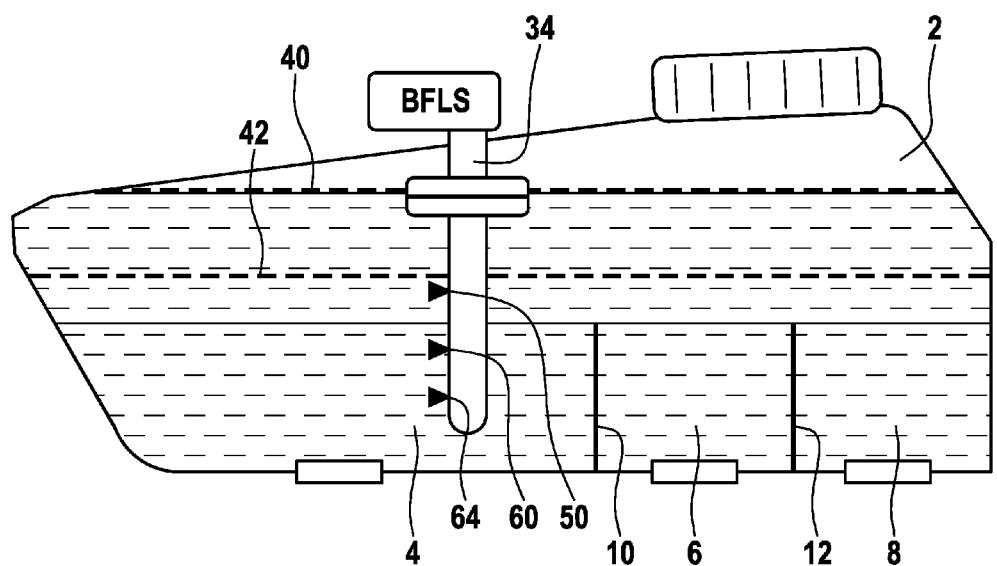
FIG. 4 shows a brake fluid reservoir.

FIG. 4 shows a brake fluid reservoir 2 of the kind used in a method according to the invention and a braking system 100 according to the invention. Like the brake fluid reservoir 2 illustrated in FIGS. 1 and 2, it has three chambers 4 (refill chamber), 6 (SC chamber), 8 (PC chamber), which are associated with the pressure supply device 20, the secondary circuit II and the primary circuit I. A maximum 40 and a minimum filling level are also defined.

In contrast to the brake fluid reservoir 2 illustrated in FIGS. 1 and 2, a third level warning stage 64 (SP3), which is below the second stage 60, is provided in addition to a first 50 (SP1) and a second level warning stage 60 (SP2).

By using a three-stage brake fluid sensor 34 and a modified concept of lower performance, the lower performance level of the single-circuit hydraulic fallback level without system intensification is prevented.

The warning strategy is modified as follows: when the first switching point or the first level warning stage 50 is reached, the by-wire mode is retained and switched to one circuit. This circuit can correspond to the physical circuit (diagonal), but can also correspond to one axle by closure of the inlet valves. In order to keep the loss of system performance as small as possible and to avoid vehicle yaw/transverse offset due to the intensification of one diagonal, intensification at the front axle is recommended when the first switching point is reached.

When the second switching point or the second level warning stage 60 is reached, the by-wire mode is retained and switched to the other circuit. In the above strategy, it would be the rear axle, but it could also be the opposite diagonal.

When the third switching point or the third level warning stage 210 is reached, the by-wire mode is ended, and the driver obtains direct mechanical control through the switchover to the TMC.

Suitable filtering over time is preferably used to filter out brief overshoots or undershoots of the warning threshold due to the dynamics of the vehicle. This filtering time is matched to the warning thresholds of the leakage and air detection system (VDM) in such a way that it is both possible to detect small leaks reliably and to detect large leaks in a timely manner. This concept leads to the unwanted fallback level being reached less often:

While one circuit, or the front/rear axle, is isolated, pressure equalization is advantageously ensured at regular intervals. For this purpose, the outlet valves of the respectively isolated wheels can be briefly opened. In addition, this is advantageously carried out after each braking process since a pressure buildup at the isolated wheels has to be carried out owing to the leaks in the inlet valves.

Figure 5:
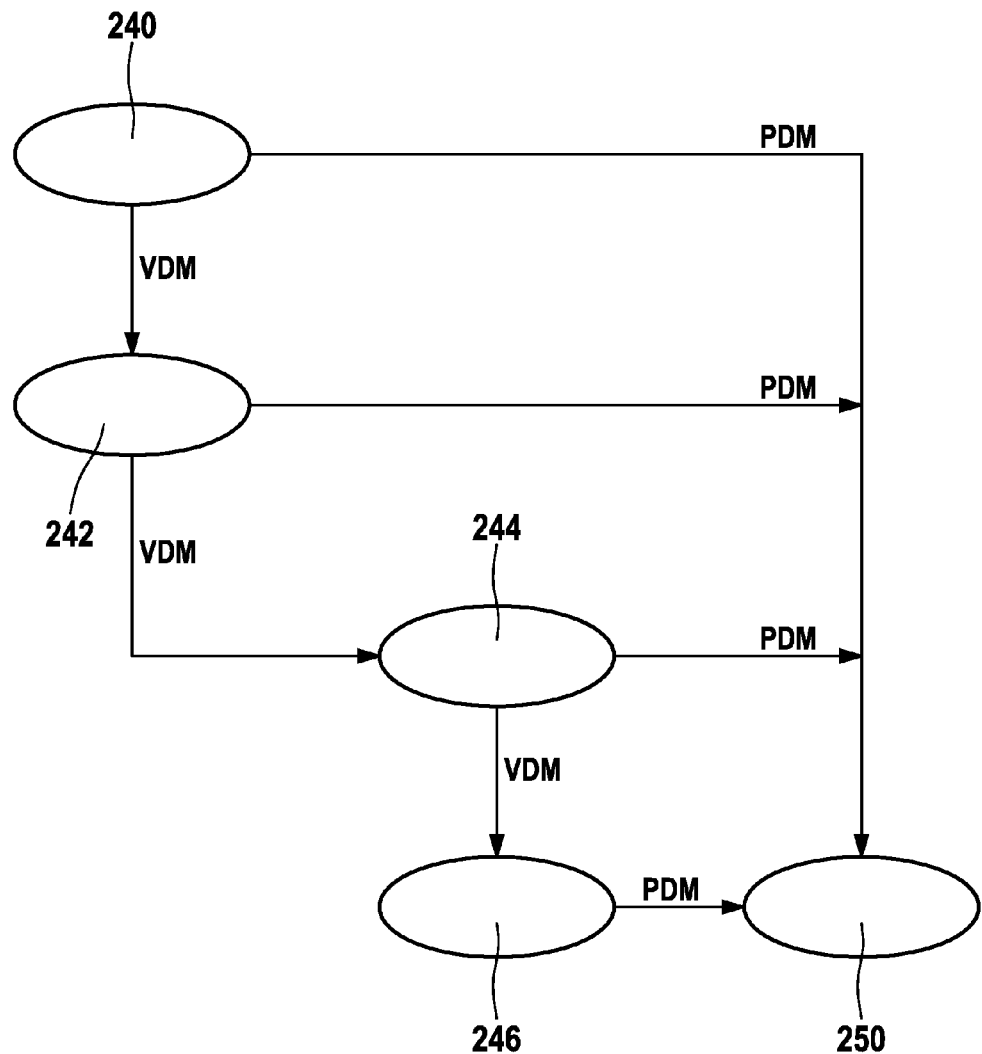
FIG. 5 shows a flow diagram of a method in a first preferred embodiment.

In addition, leakage isolation (VDM) is preferably used to identify the circuit in the case of major leaks. This is illustrated in FIG. 5 by a flow diagram.

In a block 240, the vehicle is operated in a by-wire mode. By checking the plausibility of the travel of the linear actuator or of the pressure supply device 20 in relation to the system pressure, it may be assumed that there is leakage in the system. If this assumption is made, the rear wheels 112, 124 are separated from the braking system by the inlet valves 116, 132. In block 242, only the front wheel brakes 110, 122 are supplied with brake pressure by the pressure supply device 20 in the brake-by-wire mode (front-only by-wire).

If leakage continues to be detected, the leak is located at the front axle, and the rear axle can be intensified, see block 244 (rear-only by-wire). If no leakage is detected, the system remains on the front axle.

If leakage is detected at the rear axle after a switchover, then, assuming a single fault, the leakage is in the system and not in one of the two wheel circuits.

The system can therefore be switched back to by-wire in both circuits, see block 246, until the pressure monitoring system (PDM) intervenes or the third switching point or the third level warning stage 210 is reached. In this case, a switch is made in block 250 to the hydraulic fallback level.

Figure 6:
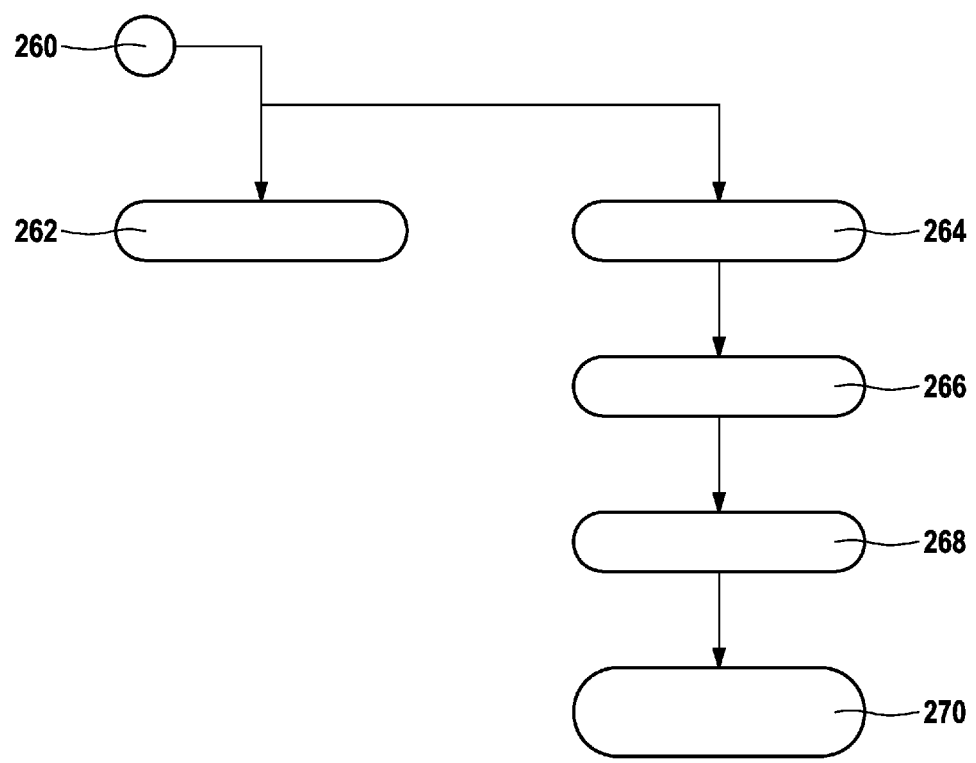
FIG. 6 shows a flow diagram of a method in a second preferred embodiment.

In another preferred embodiment of the method, a total of four level warning stages is provided, cf. FIG. 6. The method begins in block 260, in which the braking system 100 is operated in the brake-by-wire mode. In this case, the level for the first level warning stage is above the partition wall of the brake fluid reservoir 2. In a block 262, which is unconditionally initiated after starting, the first level warning stage is not reached. The braking system 100 continues to be operated in the brake-by-wire mode (no loss of performance, normal mode). In block 264, the first level warning stage is reached. The driver is warned by means of a red warning lamp. The two brake circuits I, II are separated from one another in order to avoid leakage leading to a total loss of the hydraulic build-up capacity (separation of the brake circuits by closing a sequence valve 154, 156). If required, inlet valves can furthermore be closed in unbraked driving situations.

In block 266 (front intensified), the second level warning stage is reached. The braking system 100 is now operated in such a way that wheel brake pressure is built up actively by means of the pressure supply device 20 only in the front wheel brakes 110, 122. For this purpose, the inlet valves 116, 132 which are associated with the rear wheel brakes 112, 124 are closed. If required, the inlet valves 114, 130 of the front wheel brakes 110, 122 can furthermore be closed in unbraked driving situations.

The level for the second level warning stage can be arranged above the partition wall. In this case, the front wheel brakes 110, 122 are operated in the brake-by-wire mode in the event of leakage. If the level for the second level warning stage is below the partition wall, a warning is issued to the driver, preferably by a red warning lamp, in the event of leakage in the primary circuit or in the secondary circuit.

In block 268 (rear intensified), the third level warning stage is reached. The braking system 100 is now switched in such a way that pressure is built up actively by means of the pressure supply device 20 only in the rear wheel brakes 112, 124. For this purpose, the inlet valves 114, 130 associated with the front wheel brakes 110, 122 are closed. If required, the inlet valves 116, 132 of the rear wheel brakes 112, 124 can furthermore be closed in unbraked driving situations.

The level for the third level warning stage is below the partition wall, and it is therefore possible to distinguish between leakage in the secondary circuit/primary circuit and the brake circuit containing the front wheel brakes 110, 122. The level for the zero level warning stage is chosen in such a way that each replenishment process that is allowed does not lead to the addition of air.

In block 270, the last level warning stage is reached. The braking system 100 is switched to the hydraulic fallback level. The sequence valves 154, 156 are closed, and therefore the pressure supply device 20 is separated hydraulically from the wheel brakes 110, 112, 122, 124. The isolation valves 106, 120 are opened, and therefore the chambers 86, 88 of the master brake cylinder 84 are connected hydraulically to the wheel brakes 110, 112, 122, 124. The simulator valve 168 is furthermore closed. The driver can now build up brake pressure in the wheel brakes 110, 112, 122, 124 by actuating the brake pedal 90.

Closing inlet valves 114, 116, 130, 132 can reduce or even prevent brake fluid from flowing out of a wheel brake in situations in which no braking is taking place.

VDM (as discussed in connection with FIG. 5) and isolation of the leak are preferably also performed here.

The replenishment concept can be adapted if the third level warning stage is reached in order to obtain a lower position for the zero level warning stage if there is a lack of space in the brake fluid reservoir 2.

The invention claimed is:

1. A braking system comprising:
    hydraulically actuatable wheel brakes, wherein pairs of two wheel brakes of the hydraulically actuatable wheel brakes are assigned to a respective brake circuit of a plurality of brake circuits;
    an electrically controllable pressure supply device connected to the hydraulically actuatable wheel brakes, the electrically controllable pressure supply device comprising:
        a master brake cylinder actuated by means of a brake pedal and connected to the wheel brakes; and
        a brake fluid reservoir having a first reservoir chamber and a second reservoir chamber separated by a first partition wall,
    wherein the first reservoir chamber is connected to the pressure supply device via a first port for fluid removal, via which the electrically controllable pressure supply device is supplied with pressure medium, and the second reservoir chamber is connected to the master brake cylinder via a second port for fluid removal, via which the master brake cylinder is supplied with pressure medium, wherein at least one brake fluid sensor is provided;
    a first filling level, a second filling level, and at least one third filling level of the brake fluid reservoir, wherein the filling level is measure by the at least one brake fluid sensor and wherein the second filling level is lower than the first filling level and the at least one third filling level is lower than the first and the second filling levels; and
    wherein the brake system is operated in a first operating mode when the first filling level is reached, in a second operating mode when the second filling level is reached and in a fallback mode when the at least one third filling level is reached.

2. The braking system as claimed in claim 1, wherein the brake fluid reservoir comprises three chambers, of which a first chamber of the three chambers is hydraulically associated with the pressure supply device,
    wherein the a second chamber and a third chamber of the three chambers are each hydraulically associated with the plurality of brake circuits,
    wherein adjacent chambers of the three chambers are separated by a partition wall, and
    wherein each partition wall is of a same height.

* * * * *